United States Patent [19]
Ma et al.

[11] Patent Number: 5,537,281
[45] Date of Patent: Jul. 16, 1996

[54] FLEXIBLE DISK CARTRIDGE HAVING DISK STABILIZATION MEANS

[75] Inventors: Yiping Ma; David E. Jones, both of Layton; Edward L. Rich, Ogden, all of Utah

[73] Assignee: Iomega Corporation, Roy, Utah

[21] Appl. No.: 324,572

[22] Filed: Oct. 18, 1994

[51] Int. Cl.$^6$ .................................................. G11B 23/03
[52] U.S. Cl. .................................................. 360/133
[58] Field of Search .............................................. 360/133

[56] References Cited

U.S. PATENT DOCUMENTS

| | | | |
|---|---|---|---|
| 4,296,448 | 10/1981 | Garcia, Jr. et al. | 360/135 |
| 4,658,318 | 4/1987 | Bauck et al. | 360/133 |
| 4,743,989 | 5/1988 | Bauck et al. | 360/133 |
| 4,769,733 | 9/1988 | Freeman et al. | 360/133 |
| 4,794,480 | 12/1988 | Jones et al. | 360/99.04 |
| 4,814,926 | 3/1989 | Gulbrandsen | 360/133 |
| 4,843,511 | 6/1989 | Downey | 360/133 |
| 5,189,574 | 2/1993 | Imamura et al. | 360/103 |
| 5,218,503 | 6/1993 | Martin | 360/133 |

OTHER PUBLICATIONS

IBM TDB, vol. 19, No. 7, Dec. 1976, Cartridge for Magnetic Disk, F. K. King and D. J. Wanek.
IBM TDB, vol. 25, No. 7B, Dec. 1982, Flexible Disk Cartridges, D. A. Evans.
IBM TDB, vol. 19, No. 8, Jan. 1977, Self–Pressurized Enclosure for Flexible Magnetic Disks, K. A. Boyles.
Godwin, Jim "An Introduction to the Insite 325 Floptical® Disk Drive" SPIE vol. 1078 Optical Data Storage Topical Meeting 71–79 (1989).
Benson and Bogy, "Deflection of a Very Flexible Spinning Disk Due to a Stationary Transverse Load" Transactions of the ASME vol. 45: 636–642 (1978).
Benson and Takahasi, "Mechanics of Flexible Disks in Magnetic Recording" Adv. Info. Storage Syst. 1: 15–35 (1991).

Primary Examiner—A. J. Heinz
Attorney, Agent, or Firm—Woodcock Washburn Kurtz Mackiewicz & Norris

[57] ABSTRACT

A disk cartridge comprises a flexible disk rotatably mounted in an outer casing. The outer casing comprises upper and lower shells that mate to form the casing. Each of the upper and lower shells has an inner surface disposed in facing relation to a respective surface of the disk. A number of radially extending stabilizers are arranged on the inner surfaces of the upper and lower shells so as to induce a predetermined standing wave pattern in the flexible disk as the disk spins at high speeds, and to maintain the standing wave patter as the recording heads of a disk drive move radially over the surface of the disk. Additionally, at least one pair of opposing projections are disposed on the inner surfaces of the upper and lower shells near a head access opening in the front peripheral edge of the cartridge. The opposing projections have a spacing, S, and serve to center the edge of the disk during head loading operations.

25 Claims, 9 Drawing Sheets

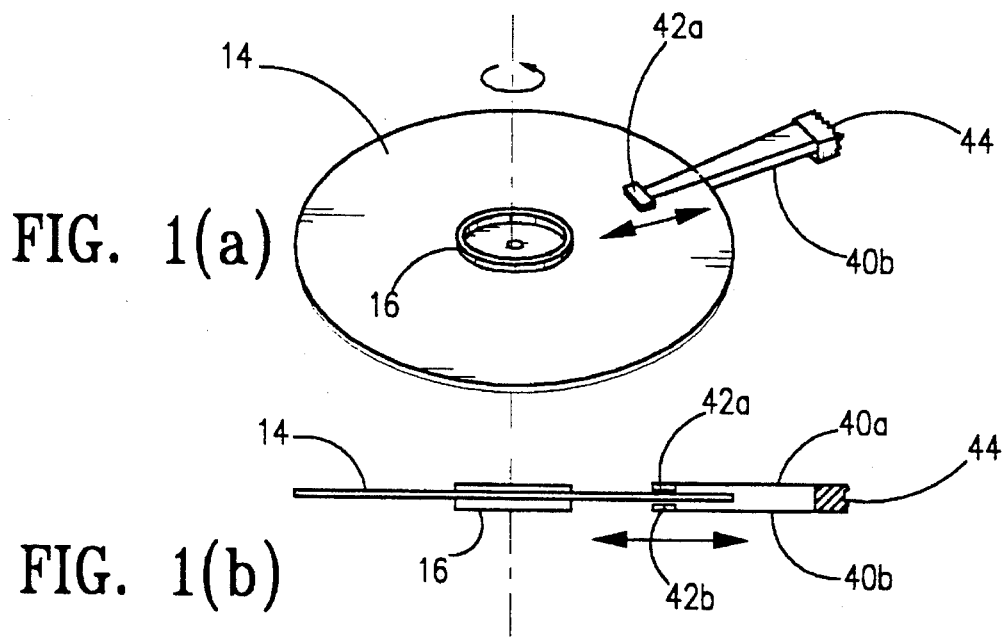
FIG. 1(a)
FIG. 1(b)
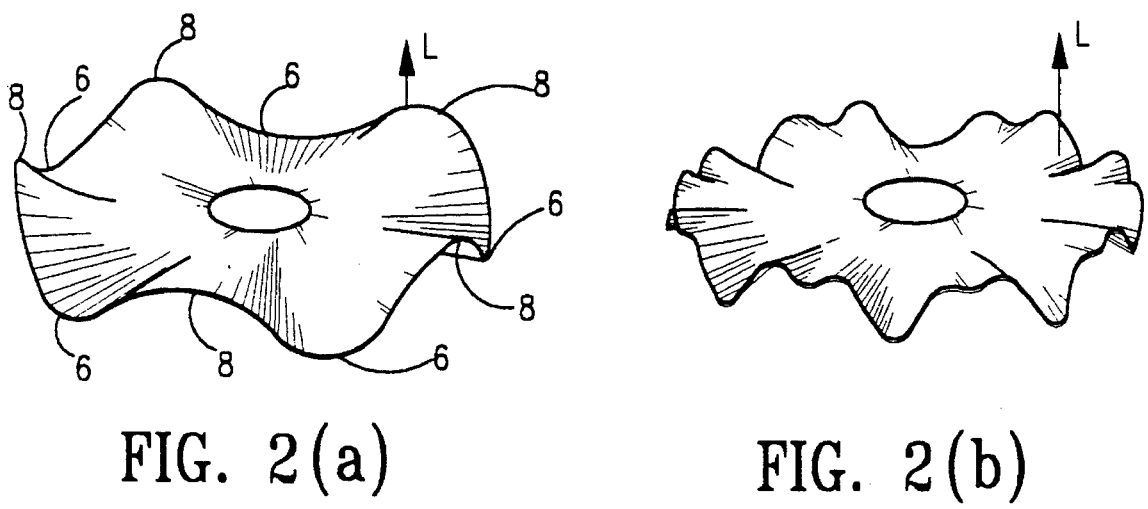
FIG. 2(a)
FIG. 2(b)

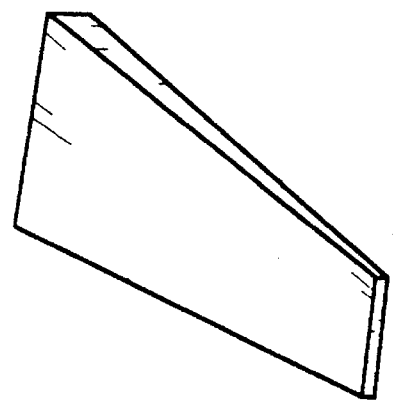
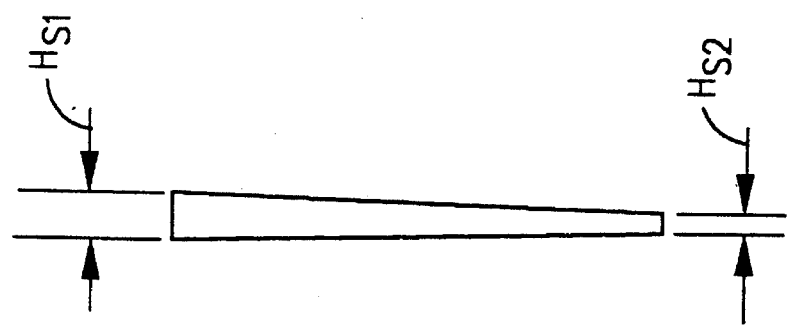
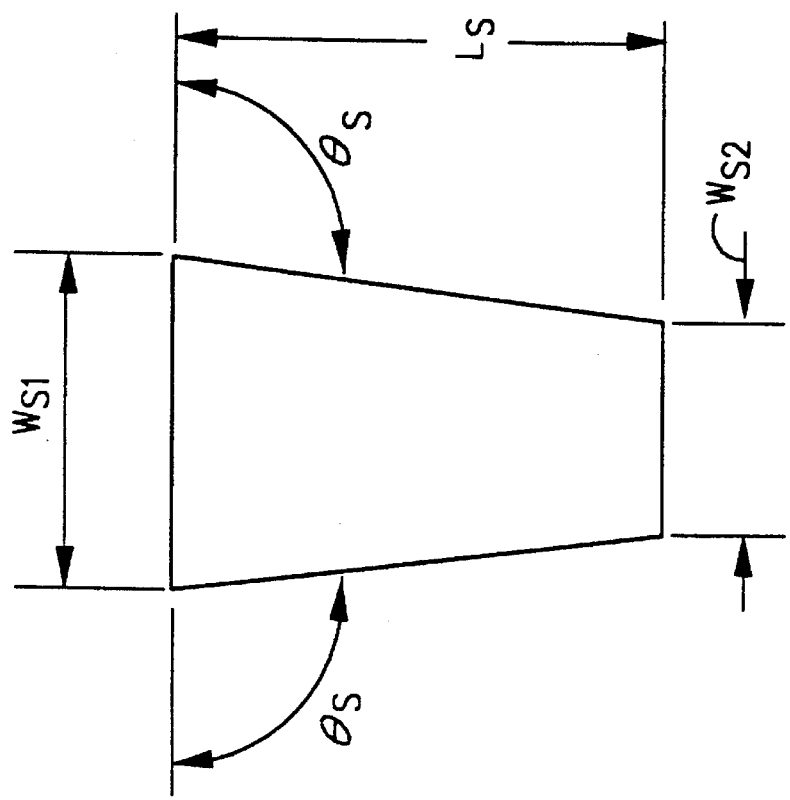
FIG. 9C
FIG. 9B
FIG. 9A

FLEXIBLE DISK CARTRIDGE HAVING DISK STABILIZATION MEANS

BACKGROUND

1. Field of the Invention

The present invention relates to a disk cartridge containing a flexible recording disk, and more particularly, to techniques for stabilizing the flexible disk within the cartridge during high speed rotation and for centering the edge of the disk to facilitate head loading onto the disk.

2. Description of the Prior Art

Removable disk cartridges for storing digital electronic information typically comprise an outer casing or shell that houses a rotatable recording medium, or disk, upon which electronic information can be stored. The cartridge shell often comprises upper and lower halves that are joined together to house the disk. The disk is mounted on a hub that rotates freely within the cartridge. When the cartridge is inserted into a disk drive, a spindle motor in the drive engages with the disk hub in order to rotate the disk within the cartridge. The outer shell of the cartridge typically has some form of opening near its forward edge to provide the recording heads of the drive with access to the recording surfaces of the disk. A shutter or door mechanism is often provided to cover the opening when the cartridge is not in use to prevent dust or other contaminants from entering the cartridge and settling on the recording surface of the disk.

Many prior art disk cartridges and associated disk drive mechanisms, such as those disclosed in U.S. Pat. Nos. 4,503,474, 5,218,503 and 5,262,918, employ magnetic hard disk technology, i.e., the cartridges contain rigid magnetic media. An advantage of using a rigid magnetic disk is that the disk is relatively stable during high speed rotation in the disk drive. The magnetic heads of the drive "fly" closely over the recording surface to achieve increased storage densities with little or no wear on the recording surface. Removable hard disk cartridges typically have capacities in the hundreds of megabytes. However, hard disk media are relatively expensive thereby undesirably increasing the cost of these removable hard disk cartridges. The same drawbacks are generally true of optical disk cartridges as well.

Conventional floppy disk cartridges, such as the standard 3.5" floppy disk cartridge used in most personal computers, employ a flexible recording medium (i.e., floppy disk) and are generally cheaper to manufacture than the aforementioned hard disk cartridges. However, in a conventional floppy disk drive, the floppy disk is rotated at relatively low speeds (e.g., 300–720 rpm), and the magnetic heads of the drive apparatus contact the disk surface as it rotates in the drive. Because of the low rotation speeds, the performance of these floppy disk cartridges is greatly reduced. Additionally, a conventional floppy disk usually can store only a few megabytes of information. Moreover, because the magnetic heads of a conventional floppy disk drive contact the floppy disk surface, the heads wear on the disk as it rotates.

One type of prior art cartridge that employs flexible media but attains increased storage capacity and higher performance is referred to in the art as a "Bernoulli" cartridge. These cartridges employ "Bernoulli" surface or plate to stabilize the rotating flexible disk during high speed rotation. As the flexible disk is rotated at high speeds (e.g. 2400 rpm) over the Bernoulli plate, an air bearing is created between the flexible magnetic disk and the rigid Bernoulli surface such that a predictable spacing between the Bernoulli surface and the magnetic disk is established. Once the flexible magnetic disk is stabilized, a specially designed recording head can be brought into close proximity to the rotating disk to achieve increased recording densities and high performance. Unfortunately, however, two sided recording with opposing read/write heads on the same disk is extremely difficult. Furthermore, Bernoulli cartridges and drives require very tight manufacturing tolerances and are therefore relatively expensive to manufacture.

Recently, there have been attempts to employ hard disk type recording heads (e.g., Winchester heads) on flexible disk media. The combination of hard disk type recording heads and flexible recording media promises to provide relatively low cost storage capabilities. Such a combination is illustrated in FIGS. 1A and 1B. The flexible disk is rotated at relatively high speeds, e.g., 3600 rpm, and the hard disk type recording heads 42a, 42b are positioned on opposite sides of the flexible media. The heads 42a, 42b are disposed on respective suspension arms 40a, 40b that are springably biased toward each other. As the flexible media rotates, an air bearing is created between the heads and respective disk surfaces that opposes the tendency of the heads to move together. As a result, the heads "fly" closely over the surface of the flexible disk. Because the magnetic heads 42a, 42b are biased toward each other and would clamp together in the absence of the opposing forces created by the aerodynamics of the spinning media, they are sometimes referred to herein as "pinching-type" heads.

High speed magnetic recording using hard disk type heads on flexible disk media has been greatly limited, however, due to the dynamics of a rotating disk subjected to a spatially fixed load, such as that imposed by the recording heads of a disk drive. A spinning flexible disk will deflect in the axial direction under an external transverse load in such a fashion that a standing wave pattern is established in the media, i.e., the disk achieves resonance. FIGS. 2(a) and 2(b) are exaggerated illustrations of a rotating disk 14 in which standing wave patterns have been established due to an external transverse load, L. As illustrated in the Figures, the standing wave pattern is characterized by a series of "peaks" 8 and "valleys" 6. The number of peaks and valleys and their angular relationship to the load, define the "mode" of the standing wave. A more detailed discussion of the behavior of a rotating flexible disk under an external transverse load can be found in Benson, R. C. & Takahashi, T. T., *Mechanics of Flexible Disks in Magnetic Recording*, Adv. Info. Storage Syst., Vol 1., pp. 15–35 (ASME 1991) and in Benson, R. C. & Bogy, D. B., *Deflection of a Very Flexible Spinning Disk Due to a Stationary Transverse Load*, Transactions of the ASME, Vol. 45 (September 1978), both of which are incorporated herein by reference.

Depending on the mechanical properties of the flexible disk and the radial and vertical positions of the recording heads (i.e., load) with respect to the axis of the disk, the "mode" or pattern of the standing wave will vary. As the standing wave transitions from one mode to another, for example, from the mode illustrated in FIG. 2(a) to that illustrated in FIG. 2(b), the disk undergoes a phenomenon know as "disk snap". Under certain conditions, the disk will undergo violent vibration as it tries to switch back and forth between two different modes. Such violent vibration will adversely affect the head-disk interface making recording and/or retrieval of information unreliable and also creating a potential for damage to the recording heads or disk surface. Another manifestation of the "disk snap" problem is that a given disk may exhibit different modes in different drives, such that the magnetic read/write signal strength may vary. This greatly undermines the advantages of removability. The problem becomes even more acute as the speed of rotation of the disk is increased above 3600 rpm. Accordingly, if high speed recording on flexible disks using hard-disk type recording heads is to be successful, a mechanism is needed for stabilizing the media so that the standing wave pattern, or mode, does not change as the heads move radially of the disk.

Prior art techniques for stabilizing a flexible disk during high speed rotation are either impractical or simply do not address the standing wave problem. For example, while the aforementioned use of a Bernoulli plate will stabilize a flexible disk and reduce the amplitude of a standing wave, the close spacing between the disk and Bernoulli plate makes two sided recording extremely difficult. Moreover, very tight manufacturing tolerances must be observed in the production of Bernoulli cartridges, thereby increasing the cost of such cartridges.

Another prior art approach to disk stabilization is the stretched surface disk. In this approach, the outer rim of the disk is clamped and under tension. The stress can be adjusted to suppress any standing waves. However, the inertia of the rotating body is large, and like the Bernoulli cartridges, two sided recording on a single disk cannot be achieved.

U.S. Pat. No. 5,189,574 describes a technique that purports to stabilize a rotating flexible disk at speeds of about 3600 rpm. According to the disclosed technique, the disk is rotated between a pair of opposing "stationary plates" each separated from the surface of the disk by a distance of about 400–800 μm. The '594 patent theorizes that the stationary plates serve to prevent the occurrence of turbulent air flow near the surface of the disk thereby reducing disk vibration and achieving stabilization. While some stabilization may be achieved, this technique fails to address the mode stabilization problem, since the elimination of turbulent flow near the surface of a disk cannot suppress the changes in standing wave patterns described above.

Accordingly, there is a need for a removable disk cartridge capable of stabilizing the standing wave pattern, or mode, of a flexible recording disk rotating at high speeds in order to prevent the occurrence of "disk snap" as the recording heads move between the outer and inner radii of the disk.

Another problem with the use of flexible media in a removable disk cartridge, particularly when the cartridge is used in conjunction with a disk drive that employs pinching-type magnetic recording heads, is that the vertical position of the edge of the disk proximate the head access opening in the disk cartridge may deviate from a nominal vertical position due to factors such as disk curl, vertical runout, hub tilt and air flow within the cartridge. Even when a rotating flexible disk has settled into a stable standing wave mode, the disk can still experience these changes in vertical position. Changes in the vertical position of the edge of the disk can interfere with the loading of pinching type heads onto the disk. The prior art has failed to address this additional problem. Accordingly, there is a further need for a flexible disk cartridge having means for vertically centering the edge of the rotating flexible disk within a predetermined tolerance in order to facilitate head loading onto the media. Such a centering means should not interfere with the aerodynamics of the rotating disk.

SUMMARY OF THE INVENTION

Accordingly, it is an object of the present invention to provide a disk cartridge having means for inducing and substantially maintaining a predetermined standing wave pattern, or mode, in a flexible recording disk rotating at high speeds in order to prevent the occurrence of "disk snap" as the recording heads of a disk drive move between the outer and inner radii of the disk.

It is a further object of the present invention to provide a disk cartridge having means for vertically centering the edge of the rotating flexible disk within a predetermined tolerance in order to facilitate head loading onto the media.

In order to achieve these and other objects of the present invention, a disk cartridge in accordance with the present invention comprises a rotatable flexible disk having at least one recording surface, and an outer casing for rotatably housing the disk. The casing comprises upper and lower shells that mate to form the casing. Each of the upper and lower shells has an inner surface disposed in facing relation, but spaced from a respective surface of the disk. At least three substantially radially extending raised stabilizers are disposed, in any combination, on the inner surfaces of the upper and lower shells. The radially extending stabilizers are arranged on the upper and lower shells so as to induce a predetermined standing wave pattern in the flexible disk when the disk rotates within the casing, and to maintain the flexible disk substantially in the predetermined standing wave pattern as a recording head of the disk drive moves over the recording surface of the rotating flexible disk.

Preferably, each of the inner surfaces of the upper and lower shells has a plurality of radially extending stabilizers spaced about a periphery of the inner surface. Additionally, each pair of adjacent stabilizers preferably has a same predetermined angular spacing, $\theta_{stab}$. In a preferred embodiment, the plurality of radially extending stabilizers on each of the inner surfaces of the upper and lower shells comprises five radially extending stabilizers on each surface. Each of the radially extending stabilizers is preferably wedge-shaped, i.e., the width and height of the stabilizer increases as the stabilizer extends outwardly of the inner surface of its respective shell.

According to another feature of the disk cartridge of the present invention, a slot is formed in each of the inner surfaces of the upper and lower shells that extends from a front peripheral edge of the shell toward a center of the shell. The respective slots cooperate to define a head access opening in the front peripheral edge of the casing and to form an elongate channel in which the recording heads of a disk drive can move to access the recording surface of the flexible disk. The opposing side edges of each slot proximate the front peripheral edge of its respective shell define a first angle, $\theta_{slot}$, with respect to a center of the one shell. It is preferable that the angular spacing, $\theta_{stab}$, between each pair of adjacent stabilizers on a particular one of the shells be at least twice $\theta_{slot}$.

According to yet another aspect of the present invention, at least one pair of opposing projections are formed on the respective inner surfaces of the upper and lower shells proximate the head access opening. The projections have a vertical spacing, S. The outer edge of the flexible disk at the head access opening is disposed between the pair of opposing projections. Vertical movement of the edge of the flexible disk is restricted to the spacing, S. In a preferred embodiment, two pairs of opposing projections are formed on the inner surfaces of the upper and lower shells on opposite sides of the head access channel proximate the head access opening. Preferably, the projections are semi-spherical. The size and position of the respective projections are such that the projections do not interfere with the aerodynamics of the rotating disk. The opposing projections provide a means for centering the edge of the rotating disk within a predetermined tolerance to facilitate head loading onto the disk.

The foregoing and other objects, features and advantages of the invention will become evident hereinafter.

BRIEF DESCRIPTION OF THE DRAWINGS

The foregoing summary, as Well as the following detailed description of the preferred embodiments, is better understood when read in conjunction with the appended drawings. For the purpose of illustrating the invention, there is shown in the drawings embodiments that are presently preferred, it being understood, however, that the invention is not limited to the specific methods and instrumentalities disclosed. In the drawings:

FIGS. 1(a) and 1(b) illustrate the use of hard disk type recording heads on a flexible recording medium;

Figure 3:
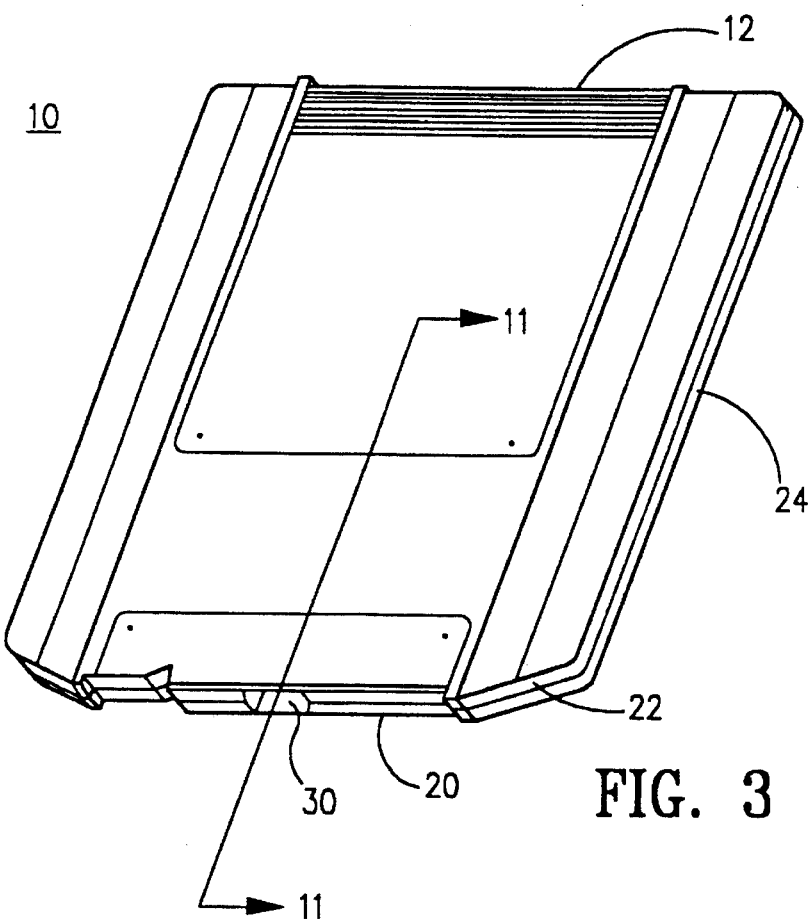
Figure 4:
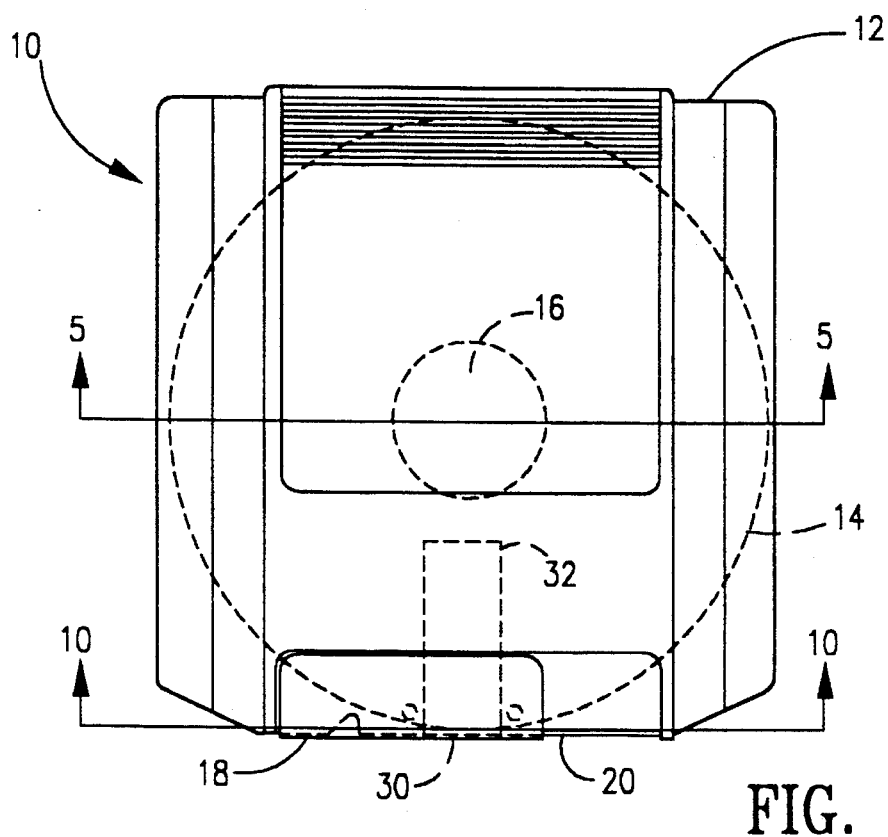
Figure 5:
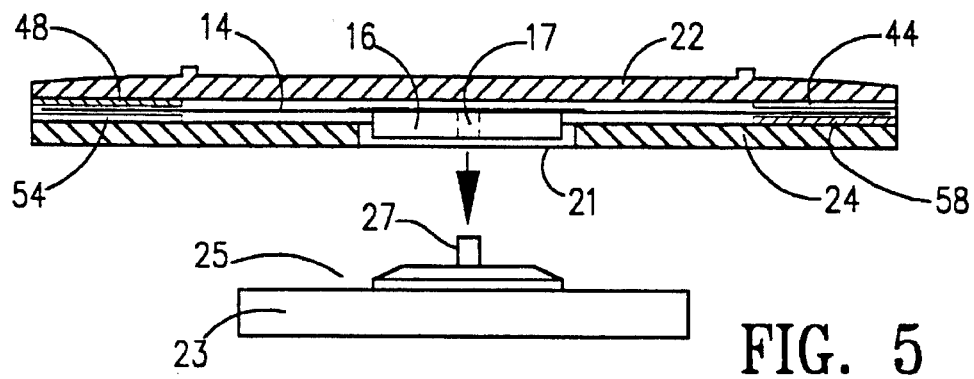
Figure 6:
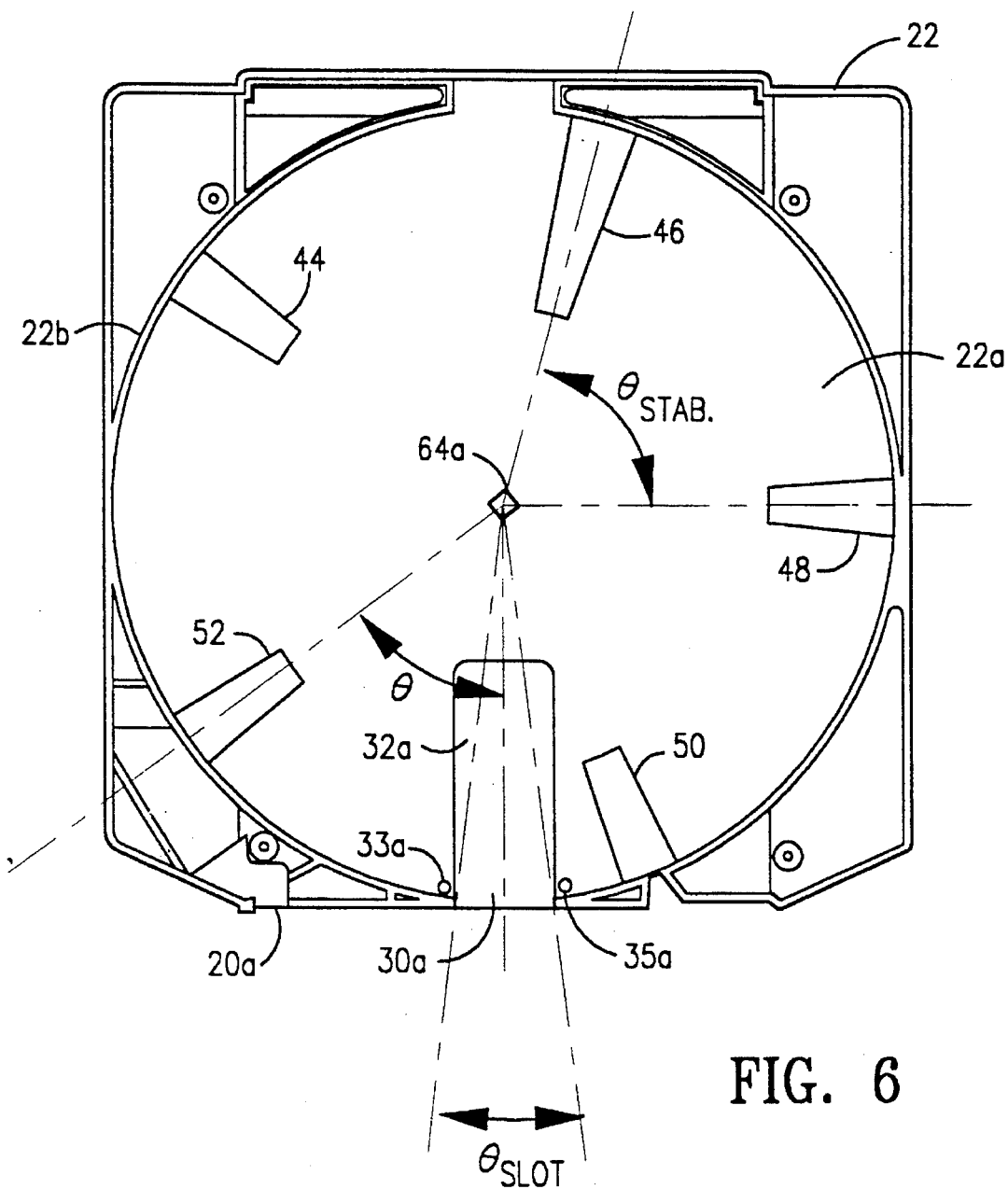
Figure 7:
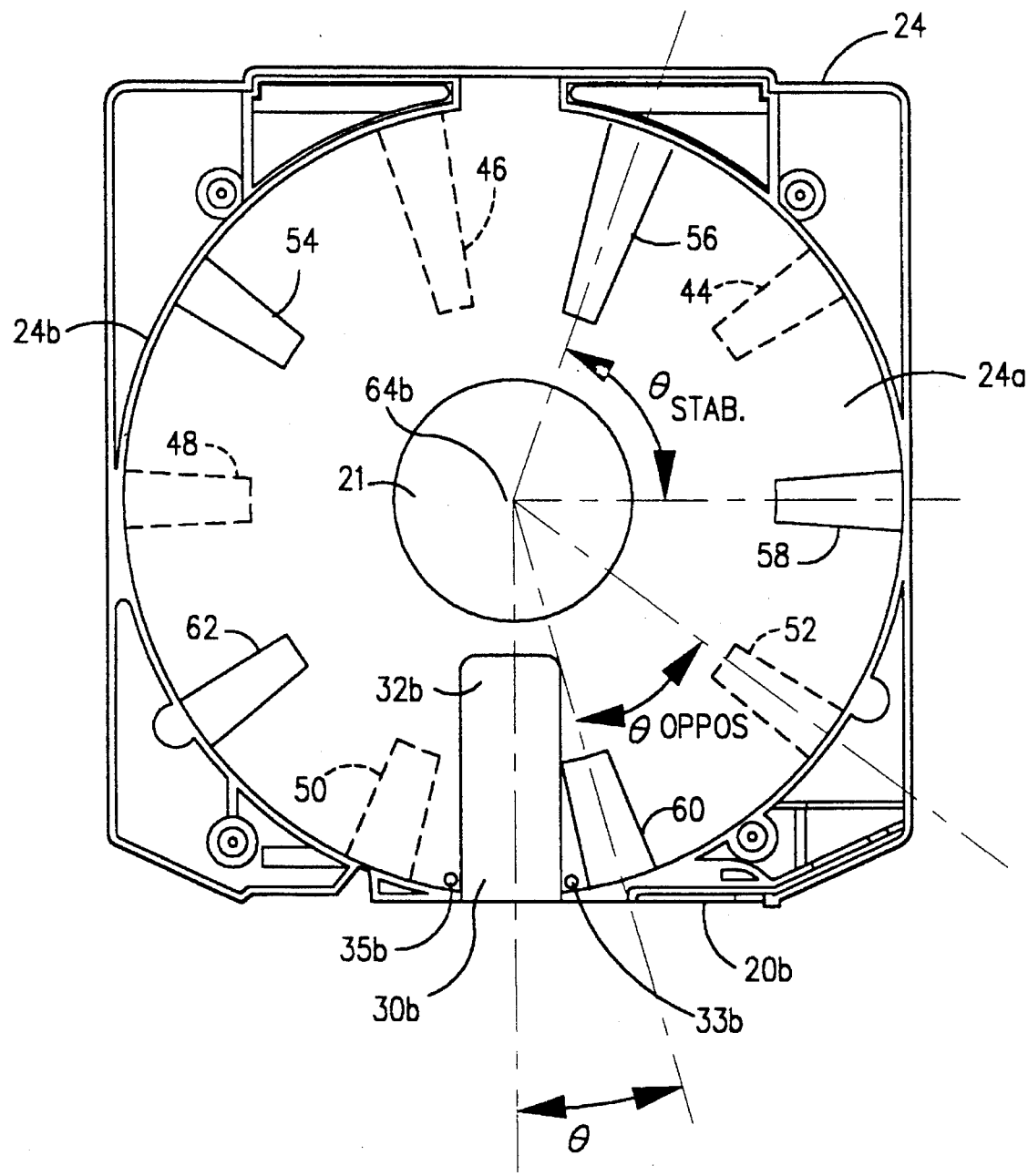
Figure 8C:
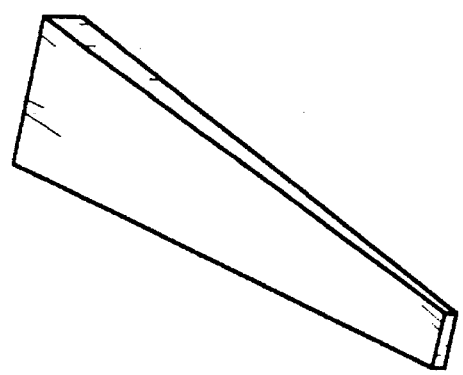
Figure 8B:
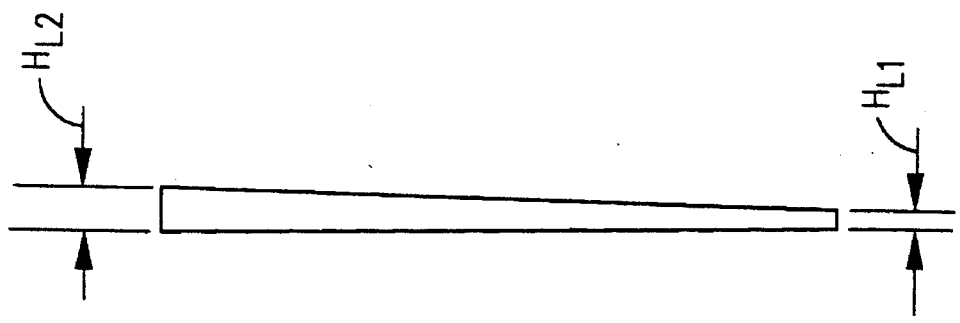
Figure 8A:
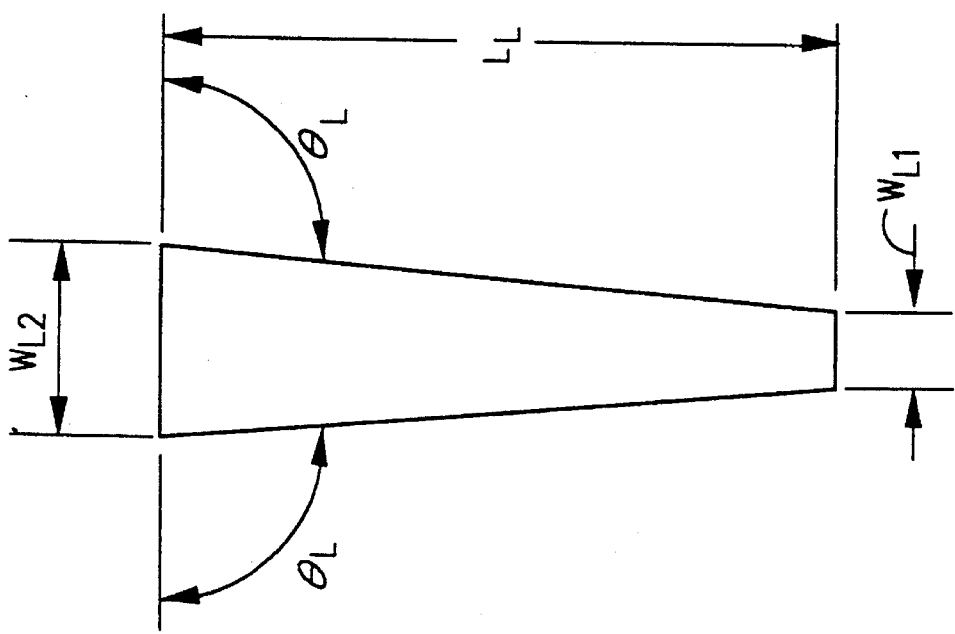
Figure 10:
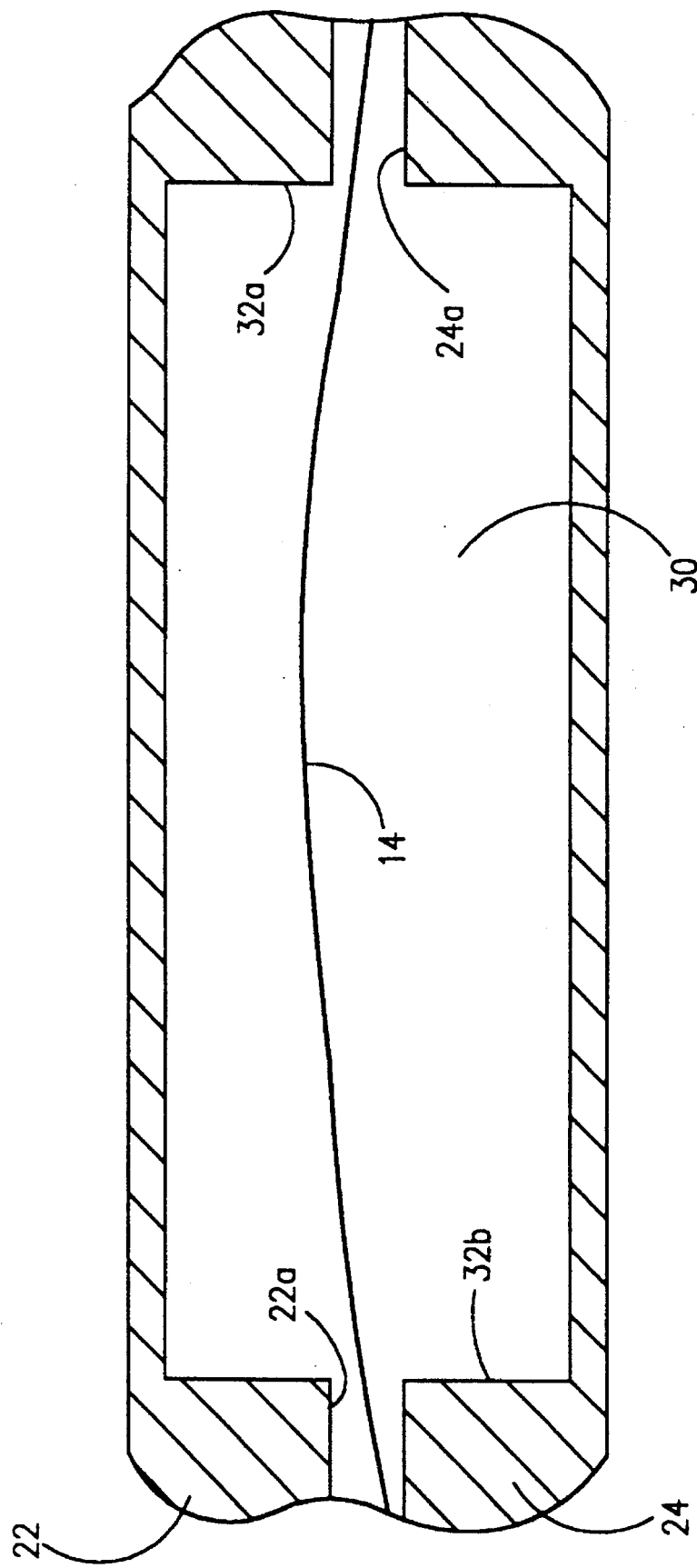
Figure 11:
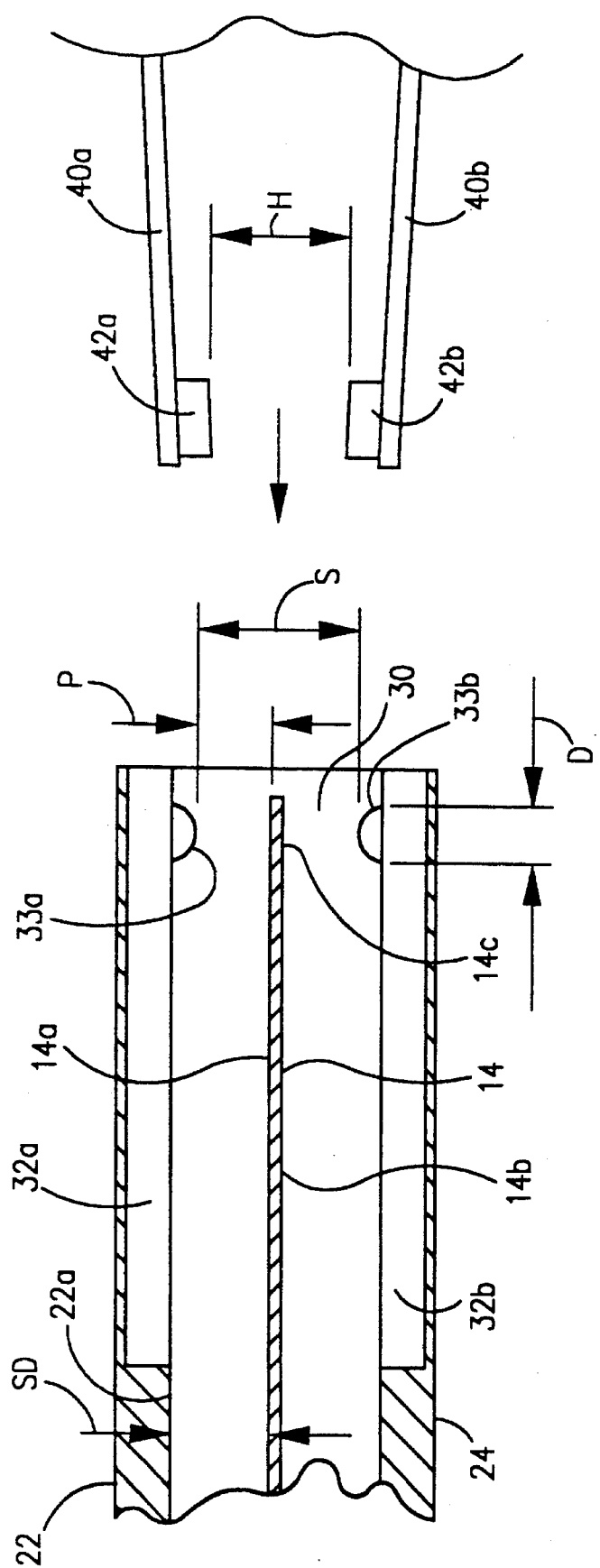
Figure 12:
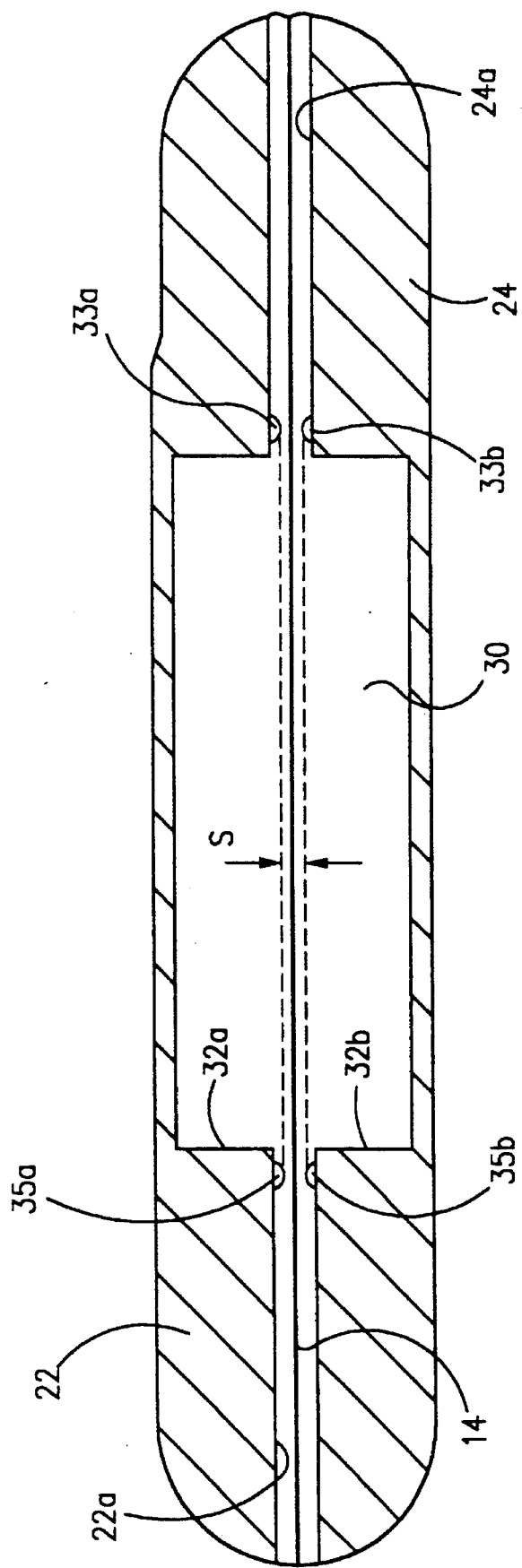

f FIGS. 2(a) and 2(b) each show a rotating flexible disk in which a standing wave pattern, or mode, has been established due to an external transverse load;

FIG. 3 is a perspective view of a disk cartridge in accordance with a preferred embodiment of the present invention;

FIG. 4 is a top view of the disk cartridge of FIG. 1;

FIG. 5 shows a sectional view of the disk cartridge of FIG. 4 taken along line 5—5 of FIG. 4 and further shows a disk drive spindle motor to which a hub of the disk cartridge may be engaged;

FIG. 6 is a plan view of the inner surface of the upper shell of the disk cartridge of FIG. 1 in accordance with a preferred embodiment of the present invention;

FIG. 7 is a plan view of the inner surface of the lower shell of the disk cartridge of FIG. 1 in accordance with a preferred embodiment of the present invention;

FIGS. 8a–c are top, side and perspective views, respectively, illustrating further details of selected ones of the substantially radially extending stabilizers shown in FIGS. 6 and 7 in accordance with the-present invention;

FIGS. 9a–c are top, side and perspective views, respectively, illustrating further details of other ones of the substantially radially extending stabilizers shown in FIGS. 6 and 7 in accordance with the present invention;

FIG. 10 is a front sectional view of a portion of the disk cartridge of FIG. 4 taken along line 10—10 of FIG. 4, illustrating an exemplary shape that the flexible disk will assume at the head access opening of the cartridge in accordance with the present invention;

FIG. 11 is a sectional view of a portion of the disk cartridge of FIG. 3 taken along line 11—11 of FIG. 3;

FIG. 12 is a front sectional view of the disk cartridge of FIG. 4 taken along line 10—10 of FIG. 4, illustrating the vertical spacing between the opposed projections of the present invention.

DETAILED DESCRIPTION OF THE PREFERRED EMBODIMENTS

Referring to the drawings wherein like numerals indicate like elements throughout, there is shown in FIGS. 3 and 4 a disk cartridge 10 comprising an outer casing 12 and a disk 14 having a hub 16 rotatably mounted in the casing 12. The casing 12 comprises upper and lower shells 22, 24 that mate to form the casing 12. A shutter 18 (FIG. 4) is provided on the cartridge 10 to cover a head access opening 30 in the front peripheral edge 20 of the casing 12 when the cartridge 10 is not in use. When the cartridge 10 is inserted into a disk drive (not shown), the shutter 18 moves to the side exposing the head access opening 30 and thereby providing the read/write heads (not shown) of the disk drive with access to the recording surface(s) of the disk 14. In the present embodiment, the disk 14 comprises a flexible or floppy magnetic disk that is formed of a thin (e.g. 0.0025 inches), flexible, circular base of polymeric film. Each side of the flexible disk is coated with a layer of magnetic recording material to form upper and lower recording surfaces.

FIG. 5 is a sectional view of the disk cartridge of FIGS. 3 and 4 taken along line 5—5 of FIG. 4. As shown, the lower shell 24 of the cartridge has an opening 21 through which the hub 16 of the flexible disk may be accessed. FIG. 5 further illustrates the components of a spindle motor mechanism that may be mounted in a disk drive apparatus (not shown) in order to rotate the flexible disk at high speeds. As shown, the spindle motor mechanism comprises a generally circular spindle 25 that mates with the hub 16 of the disk cartridge 10 when the disk cartridge is inserted into the disk drive. A cylindrical projection 27 on the spindle 25 engages a cylindrical hole 17 in the disk hub 16 to ensure proper centering of the flexible disk on the spindle 25. A motor 23 coupled to the spindle 25 rotates the flexible disk 14 at speeds in excess of about 1800 rpm, and more preferably, at speeds of 3600 rpm or greater. A preferred disk drive apparatus that incorporates the spindle motor mechanism, and in which the disk cartridge of the present invention may be employed, is disclosed in co-pending application Se. No. 08/324,808 filed concurrently herewith, entitled "Apparatus for Performing Multiple Functions in a Data Storage Device Using a Single Electro-Mechanical Device" (Attorney Docket IOM-8906) and co-pending application Se. No. 08/324,671 filed concurrently herewith, entitled "Disk Cartridge and Data Storage Device for Receiving Same" (Attorney Docket IOM-8907), both of which are hereby incorporated by reference.

Referring to FIG. 6, the upper shell 22 of the outer casing 12 has an inner surface 22a which is disposed in facing relation to the upper surface 14a of the flexible disk 14 when the upper and lower shells 22, 24 are joined together. The inner surface 22a of the upper shell 22 is substantially planar. An opening 30a is provided in the front edge 20a of the upper shell 22, and a slot 32a is formed in the upper shell 22 that extends from the opening 30a toward the center of the shell 22. The opposite side edges of the slot 32a proximate the front peripheral edge 20a of the shell 22 define an angle, $\theta_{slot}$, with respect to a center 64a of the shell 22. In the present embodiment, $\theta_{slot}$ is approximately thirteen degrees (13°).

FIG. 7 shows a similar view of the lower shell 24. The lower shell 24 has an inner surface 24a that is disposed in facing relation to the lower surface 14b of the disk 14 when the upper and lower shells are joined. As with the upper shell 22, the inner surface 24a of the lower shell 24 is also substantially planar. A circular cutout 21 is formed in the lower shell 24 to provide access to the disk hub 16. As further shown, the lower shell 24 includes an opening 30b and a slot 32b substantially identical to that formed in the upper shell 22. In the preferred embodiment, the distance between each of the inner surfaces 22a, 24a and the respective surfaces of the flexible disk 14a, 14b is approximately 0.5 mm.

When the upper and lower shells 22, 24 are joined to form the outer casing 12 of the disk cartridge 10, the opening 30a of slot 32a in the upper shell 22 cooperates with the opening 30b of slot 32b in the lower shell 24 to define a head access opening 30 (FIG. 1) in the front peripheral edge 20 of the cartridge 10. The slots 32a, 32b further cooperate to form an elongate channel through which the magnetic heads (not shown) of a disk drive can move to access the recording surface(s) of the disk 14. As best shown in FIG. 1, according to an important feature of the cartridge 10 of the present invention, there is no aperture or opening in either the upper or lower shell surfaces. Rather, the slots 32a, 32b form a closed channel within the cartridge. The only opening through which the magnetic heads of a disk drive can enter the cartridge is the opening 30 formed on the front peripheral edge 20 of the cartridge 10 by the respective shell openings 30a and 30b. By providing a head access opening only in the front edge 20 of the cartridge, the risk of contaminants entering the cartridge and reaching the recording surface of the disk 14 is reduced.

According to the present invention, the disk cartridge 10 further comprises at least three substantially radially extending raised stabilizers disposed, in any combination thereof, on the inner surface 22a, 24a of one of the upper and lower shells 22, 24. In the preferred embodiment, the inner surface 22a of the upper shell 22 has five substantially radially extending stabilizers 44 . . . 52, and the inner surface 24a of the lower shell 24 has a same number of radially extending stabilizers 54 . . . 62. The radially extending stabilizers are arranged on the inner surfaces of the upper and lower shells so as to induce a predetermined standing wave pattern in the flexible disk 14 when the flexible disk 14 rotates within the casing 12 and to maintain the flexible disk 14 substantially in the predetermined standing wave pattern as the recording heads (e.g., heads 42a, 42b) of a disk drive move over the recording surfaces of the rotating flexible disk 14. Each pair of adjacent stabilizers on both the upper and lower inner surfaces 22a, 24a has a predetermined angular spacing, $\theta_{stab}$, which in the preferred embodiment is approximately seventy-two degrees (72°).

The stabilizers 44 . . . 62 stand up from their respective inner surfaces and are believed to affect the aerodynamics of the flexible disk 14 as it rotates within the cartridge at high speeds (e.g., greater than 1800 rmp). It is believed that the stabilizers create pressure differences in the regions next to the stabilizers as the disk spins. The pressure differences force the disk into a predetermined standing wave pattern, or mode, such that the peaks and valleys of the standing wave are substantially fixed and the mode of the standing wave does not change as the recording heads of a disk drive move radially over the surface of the disk. By inducing a predetermined standing wave pattern in the disk and maintaining the disk substantially in that pattern no matter where the recording heads are positioned on the disk, the radially extending stabilizers of the present invention prevent the occurrence of "disk snap" and ensure a reliable head-disk interface. Only a slight modification of the standing wave will occur in the neighborhood of the recording heads and any such slight modification will not adversely affect the head-disk interface.

It has been found that at least three (3) stabilizers disposed in any combination thereof on the inner surfaces 22a, 24a of the upper and lower shells 22, 24 are sufficient to induce a standing wave pattern in the rotating flexible disk and to prevent disk snap. As used herein and in the claims, "any combination" means that two of the at least three stabilizers can be disposed on one shell and the third disposed on the other shell, or alternatively, all three stabilizers can be disposed on a same one of the shells 22, 24. While at least three stabilizers will suffice, a greater number of stabilizers is preferred. Additionally, while a standing wave pattern can be induced with stabilizers positioned only on one of the inner surfaces of the upper and lower shells 22, 24, it has been found that better results are achieved when stabilizers are arranged in some combination on both of the opposing inner surfaces 22a, 22b.

It has further been discovered that the angular spacing between adjacent stabilizers, $\theta_{stab}$, on one inner surface 22a, 24a should be substantially the same as the angular spacing between adjacent stabilizers on the other inner surface 22a, 24a. Moreover, the stabilizers on one inner surface are preferably not positioned directly opposite the stabilizers on the opposite inner surface. Rather, the stabilizers on one inner surface are preferably clocked (i.e., offset) from the stabilizers on the opposite inner surface by a predetermined angle, $\theta_{oppos}$. Preferably, $\theta_{oppos}$ is approximately ½ $\theta_{stab}$, i.e., the stabilizers on one inner surface 22a, 24a are positioned approximately exactly between the two closest stabilizers on the opposite inner surface 22a, 24a. However, this is not required.

It has been found that a rotating flexible disk is more susceptible to disk snap at higher speeds of rotation. At higher speeds, it is preferable to use either higher and/or longer stabilizers or to use more stabilizers with a smaller angular spacing, It is preferable for each of the inner surfaces 22a, 24a of the upper and lower shells 22, 24 to have a plurality of stabilizers equally positioned about their respective peripheries 22b, 24b. Of course, the ability to place stabilizers evenly about the periphery of each inner surface depends on the width of the head access slot 32, i.e., the value of $\theta_{slot}$, as well as the number of stabilizers and their angular spacing, $\theta_{stab}$. Obviously, stabilizers cannot be positioned in the slot. It has been found that a plurality of stabilizers can be evenly spaced about the periphery of the inner surfaces 22a, 22b of each shell 22, 24 when $\theta_{stab}$ is at least twice $\theta_{slot}$.

The stabilizers 44 . . . 62 are preferably wedge shaped, i.e., the widths and heights of each stabilizer increase as the stabilizers extend outwardly toward the peripheries 22b, 24b of their respective inner surfaces 22a, 24a. The wedge shape minimizes the risk of contact between the rotating medium and each stabilizer. As explained above, the stabilizers of the present invention will induce a fixed standing wave pattern in the rotating disk 14, i.e., the angular position of the peaks and valleys of the standing wave will not change. The distance between adjacent peaks of the standing wave, and the amplitude of the standing wave, are greatest near the outer diameter of the disk. While the standing wave pattern will not change, the disk may still experience some vertical runout. That is, the absolute vertical position of the disk at a fixed spatial location may vary over time, even though the disk has assumed a particular standing wave pattern. Because of the possibility of vertical runout, and the general shape and relationship between adjacent peaks and valleys of the standing wave pattern, the likelihood of contact between the surface of the rotating disk and the radially extending stabilizers is minimized if the stabilizers are wedge-shaped. Stabilizers with other shapes, such as a purely rectangular shape, will increase the likelihood of contact with the disk surface. Such contact is undesirable.

The precise shape of the standing wave depends on a number of factors including (i) the height, length, width and shape of the stabilizers, (ii) the total number of stabilizers on each surface, (iii) the angle between adjacent stabilizers on the same surface ($\theta_{stab}$), (iv) the angular relationship between the stabilizers on one surface and the stabilizers on the opposite inner surface ($\theta_{oppos}$), and (v) the angular placement of the stabilizers on each surface relative to the center lines of the respective head access slots 32a, 32b ($\theta_U$, $\theta_L$). The value $360/\theta_{stab}$ generally defines the number of peaks and valleys of the standing wave induced in the rotating disk. However, when $\theta_{stab}$ is less than twice the value of $\theta_{slot}$, there may be less peaks and valleys than expected due to the fact that one cannot put stabilizers in the slot. The missing peaks and valleys usually occur in or around the slot. It should be noted, however, that even when this happens, the mode control ability of the present invention is still intact.

In the embodiment shown in FIGS. 6 and 7, there are five stabilizers on each of the inner surfaces 22a, 24b of the upper and lower shells 22, 24. The stabilizers 44 ... 52 (upper shell) and 54 ... 62 (lower shell) are spaced equally about the periphery 22b, 24b of their respective inner surfaces 22a, 24a. The angular spacing between each pair of adjacent stabilizers, i.e., $\theta_{stab}$, is approximately 72 degrees. The angular offset, $\theta_{oppos}$, between the stabilizers 44 ... 52 on the upper inner surface 22a and the stabilizers 54 ... 62 on the lower inner surface 24a is approximately thirty-six degrees (36°). A first stabilizer 60 on the inner surface 24a of the lower shell 24 forms an angle, $\theta_L$, with a centerline of the respective slot 32b. In the present embodiment, $\theta_L$ is approximately fourteen (14) degrees. A first stabilizer 52 on the inner surface 22a of the upper shell 22 forms an angle, $\theta_U$, with a centerline of the respective slot 32a. In the present embodiment, $\theta_U$ is approximately fifty (50) degrees.

Liners may be placed over the stabilizers to protect and clean the rotating medium as it spins. Even after being lined, the top surfaces of the stabilizers preferably remain spaced from, and do not contact, the respective recording surfaces 14a, 14b of the flexible disk 14. Contact is undesirable because it creates higher drag and wear on the disk surface. Preferably, the inner surfaces 22a, 24a of the upper and lower shells 22, 24 are lined using the fuzzed liners disclosed in co-pending application Ser. No. 08/324,529, entitled "Disk Cartridge with Fuzzed Liner" (Attorney Docket: IOM-8764), incorporated herein by reference, in which the main body of the liners also do not contact the recording surfaces of the disk. In the present embodiment, the two stabilizers 46, 56 farthest from their respective slots 32a, 32b on the upper and lower shells have a greater length than the remaining, shorter stabilizers on each shell 22, 24. The purpose of this is to enhance the cleaning ability of the "fuzzed" liners disclosed in the aforementioned co-pending application. It is recommended to use the stabilizers farthest from the respective slots 46, 56 for this cleaning purpose. It has been found that the stabilizers farthest from the slots 32a, 32b can be manipulated without significant impact on the disk shape at the slots 32a, 32b.

FIGS. 8(a–c) provide further details of the size and shape of each of the shorter stabilizers 44, 48, 50, 52, 54, 58, 60 and 62. As shown, the shorter stabilizers are preferably wedge-shaped and have a length $L_s$, which in the preferred embodiment is approximately 15.2 mm. The width of each stabilizer preferably increases as the stabilizer extends outwardly of its respective shell 22, 24. The end closest to the center 64 of the shell 22, 24 has a width $W_{S1}$, which in the preferred embodiment is approximately 5.34 mm. The end farthest from the center of the shell has a width $W_{S2}$, which in the preferred embodiment is approximately 8.0 mm. The height of each of the shorter stabilizers also preferably increases as the stabilizer extends outwardly of its respective shell. The end closest to the center 64 of the shell 22, 24 has a height $H_{S1}$, which in the preferred embodiment is approximately 0.30 mm. The end farthest from the center of the shell has a height $H_{S2}$, which in the preferred embodiment is approximately 0.38 mm. The aforementioned height dimensions include any height added after lining the inner surface of the cartridge.

FIGS. 9(a–c) provide further details of the longer stabilizers 46, 56 on the respective inner surfaces 22a, 24a of the upper and lower shells 22, 24. Like the shorter stabilizers, the longer stabilizers 46, 56 are preferably wedge shaped, i.e., the height and width of each stabilizer 46, 56 increase as the stabilizer extends outwardly of its respective shell. The longer stabilizers have a length $L_L$, which in the preferred embodiment is approximately 28.0 mm. The end closest to the center 64 of the shell 22, 24 has a width $W_{L1}$ and height $H_{L1}$, which in the preferred embodiment are approximately 3.1 mm and 0.23 mm respectively. The width $W_{L2}$ and height $H_{L2}$ of the end farthest from the center of the shell are preferably identical to the width $W_{S2}$ and height $H_{S2}$ of the shorter stabilizers 44, 48, 50, 52, 54, 58, 60 and 62.

With the arrangement of stabilizers shown in FIGS. 6 and 7, a flexible disk rotating at at least 1800 rpm, and preferably 3600 rpm or greater, will assume a standing wave pattern similar to that illustrated in FIG. 2(a), i.e., the standing wave will have approximately five peaks and valleys. FIG. 10 is a front sectional view of the disk cartridge 10 illustrating the approximate shape of the edge of the flexible disk 14 at the head access opening 30 after assuming such a standing wave pattern. As shown, as a result of the mode stabilization technique of the present invention, the edge of the disk 14 at the head access opening 30 is not planar. The design parameters (e.g., size, shape and number of stabilizers, $\theta_{stab}$, $\theta_{slot}$, $\theta_{oppos}$, $\theta_U$ and $\theta_L$) described above all affect the shape of the flexible disk 14 within the elongate channel formed by the upper and lower slots 32a, 32b. These parameters can be adjusted to achieve a desirable head-disk interface. In the case where one or more stabilizers (e.g., stabilizers 50, 60 of FIGS. 6–7) are positioned close to the head access slots 32a, 32b, it is desirable to reduce the length and/or height of those stabilizers so that the vertical motion of the flexible disk under influence of the recording heads is not overly restrained. This will not be a problem in cases where no stabilizers are positioned close to the slots 32a, 32b.

It is understood that the size, shape, number and arrangement of stabilizers shown in FIGS. 6 and 7 represent a preferred embodiment, and the present invention is by no means limited thereto. Other sizes, shapes, numbers and arrangements of stabilizers may be employed as needed to achieve a desirable disk shape in the head access slot 32. Additionally, while the present invention has been illustrated in connection with a disk drive having recording heads 42a, 42b disposed on the suspension arms 40a, 40b of a linear actuator, the standing wave mode stabilization techniques of the present invention can be employed in disk drives having rotary actuators as well. In such a case, it may be desirable to employ curved stabilizers such that the disk shape at the head access slot conforms to the head motion. Alternatively, straight stabilizers could be employed at an angle such that they do not extend purely radially of the disk. The term "substantially radially extending" as used herein and in the claims is intended to encompass all such variations. Furthermore, the mode stabilization technique of the present invention can be employed in disk cartridges having multiple flexible recording disks in a stacked arrangement. In such cases, disk-shaped plates can be positioned between the stacked media to provide surfaces upon which the stabilizers of the present invention can be positioned.

Referring again to FIG. 6 and 7, in accordance with a further aspect of the present invention, the inner surface 22a of the upper shells 22 has at least one, and preferably two, projections 33a 35a formed thereon proximate the front peripheral edge 20a of the shell 22 and adjacent the slot 32a formed therein. Similarly, the inner surface 24a of the lower shell 24 has at least one, and preferably two, projections 33b, 35b formed thereon proximate the front peripheral edge 20b of the shell 24 and adjacent the slot 32b formed therein. As best shown in FIGS. 11 and 12, when the upper and lower shells 22, 24 are joined to form the casing 12 of the disk cartridge 10, the projections 33a and 33b form a first pair of opposing projections on one side of the head access slot 32 having a vertical spacing, S. Similarly, the projections 35a and 35b form a second pair of opposing projections on the opposite side of the head access slot 32 near the head access opening 30 in the front peripheral edge 20 of the cartridge.

As best shown in FIG. 11, the outer edge 14c of the flexible disk is disposed between the respective pairs of opposing projections 33, 35. The opposing projections 33, 35 cooperate to form a centering means for centering the outer edge 14c of the flexible disk 14 during head loading operations. In particular, the projections 33, 35 restrict the vertical movement of the edge 14c of the flexible disk 14 to the spacing, S. As explained above, even when a fixed standing wave pattern has been established in the rotating disk 14, the vertical position of the disk may still vary due to a number of factors. Consequently, the vertical position of the flexible disk 14 may vary across the head access opening 30. This can cause problems during loading of the magnetic recording heads 42a, 42b onto the recording surfaces 14a, 14b of the disk. Generally, the opposing heads 42a, 42b will have a maximum separation, H, as they approach the edge 14c of the disk 14 during a head loading operation. According to the present invention, the spacing S between each pair of projections 33, 35 ensures that vertical position of the edge 14c of the disk 14 does not exceed the maximum separation, H, of the recording heads 42a, 42b. That is, the edge 14c of the disk 14 is centered between each pair of opposing projections 33, 35. Preferably, the spacing, S, between each pair of opposing projections 33, 35 is less than or equal to the maximum separation, H, of the recording heads as they move past the edge 14c of the disk 14 and onto the respective recording surfaces 14a, 14b.

In the present embodiment, the spacing SD between each of the upper and lower inner surfaces 22a, 22b (including any liners that may be attached thereto) and the respective surfaces 14a, 14b of the flexible disk 14 is approximately 0.5 mm. The projections extend above their respective inner surfaces 22a, 24a approximately 0.2 mm, resulting in a disk-to-projection spacing, D, of about 0.3 mm. Neglecting the thickness of the flexible disk, this results in a spacing (S) between projections of approximately 0.6 mm.

The projections 33a 33b, 35a, 35b are preferably rounded. The rounded shape reduces the likelihood of damage to the disk 14 in the event the disk 14 contacts one of the projections 33a 33b, 35a, 35b. In the preferred embodiment, the diameter of the projections, D, is approximately 0.2 mm. It is important that the projections be relatively small and positioned close to the front peripheral edge 20 of the cartridge so that they do not interfere with the aerodynamics of the spinning disk 14.

As the foregoing illustrates, the present invention is directed to a means for inducing and maintaining (i.e., stabilizing) a predetermined standing wave pattern, or mode, in a flexible recording disk during high speed rotation, and further, to a means for centering an edge of the disk proximate the head access opening of the cartridge to facilitate head loading onto the disk. It is understood that changes may be made to the embodiments described above without departing from the broad inventive concepts thereof. Accordingly, the present invention is not limited to the particular embodiments disclosed, but is intended to cover all modifications that are within the spirit and scope of the invention as defined by the appended claims.

What is claimed is:

1. A removable disk cartridge for a disk drive comprising:

a rotatable flexible disk having at least one recording surface;

an outer casing for rotatably housing said disk, said casing comprising upper and lower shells that mate to form said casing, each of said upper and lower shells having an inner surface disposed in facing relation, but spaced from a respective surface of said disk; and at least three substantially radially extending raised stabilizers, at least one of said at least three radially extending stabilizers being disposed on the inner surface of one of said upper and lower shells, and the other of said at least three radially extending stabilizers being disposed on the inner surface of the other of said upper and Lower shells, each of said substantially radially extending stabilizers being spaced from said flexible disk, said radially extending stabilizers being arranged on said upper and lower shells such that the stabilizers on one of said upper and lower shells are not positioned directly opposite the stabilizers on the other of said upper and lower shells, said radially extending stabilizers inducing a predetermined standing wave pattern in the flexible disk when said disk rotates within said casing and maintaining the flexible disk substantially in said predetermined standing wave pattern as a recording head of the disk drive moves over the recording surface of the rotating flexible disk.

2. The disk cartridge recited in claim 1 wherein each of the inner surfaces of said upper and lower shells has a plurality of said radially extending stabilizers spaced about a periphery of said each inner surface, each adjacent pair of stabilizers on a particular one of the inner surfaces of said upper and lower shells having a predetermined angular spacing, $\theta_{stab}$.

3. The disk cartridge recited in claim 2 wherein the angular spacing, $\theta_{stab}$, between each adjacent pair of stabilizers on a particular one of the inner surfaces of said upper and lower shells is substantially identical.

4. The disk cartridge recited in claim 2 wherein the plurality of radially extending stabilizers on each of the inner surfaces of said upper and lower shells comprises five radially extending stabilizers on each surface.

5. The disk cartridge recited in claim 4 wherein the five radially extending stabilizers on the inner surface of each of the upper and lower shells are substantially equally spaced about a periphery of the inner surface, the angular spacing between each adjacent pair of stabilizers being approximately 72 degrees.

6. The disk cartridge recited in claim 1 wherein said radially extending stabilizers are substantially wedge-shaped.

7. The disk cartridge recited in claim 1 wherein each of said radially extending stabilizers has a height that increases as the stabilizer extends outwardly of said casing.

8. The disk cartridge recited in claim 1 wherein each of said radially extending stabilizers has a width that increases as said stabilizer extends outwardly of said casing.

9. The disk cartridge recited in claim 1 wherein a slot is formed in each of the inner surfaces of the upper and lower shells that extends from a front peripheral edge of the shell toward a center of the shell, said slots cooperating to define a head access opening in the front peripheral edge of said casing and forming an elongate channel in which the recording heads of a disk drive can move to access the recording surface of said flexible disk.

10. The disk cartridge recited in claim 9 further comprising at least one pair of opposing projections formed on the respective inner surfaces of the upper and lower shells proximate the head access opening, said at least one pair of opposing projections having a vertical spacing, S, the outer edge of said flexible disk at the head access opening being disposed between said at least one pair of opposing projections, whereby vertical movement of the edge of said flexible disk is restricted to said spacing, S.

11. The disk cartridge recited in claim 10 wherein said pair of projections are rounded.

12. The disk cartridge recited in a claim 10 wherein said at least one pair of opposing projections comprises two pairs of opposing projections, said two pairs of opposing projections being formed on opposite sides of said elongate channel proximate the head access opening.

13. The disk cartridge recited in claim 9 wherein the slot on the inner surface of one of said shells has opposing side edges, the opposing side edges of the slot proximate the front peripheral edge of said shell defining an angle, $\theta_{slot}$, with respect to a center of said one shell, the inner surface of said one shell having a plurality of said radially extending stabilizers spaced about a periphery of the inner surface, each pair of adjacent stabilizers having a same predetermined angular spacing, $\theta_{stab}$, and further wherein $\theta_{estab}$ is at least twice $\theta_{slot}$.

14. A removable disk cartridge for a disk drive comprising:

a rotatable flexible disk having at least one recording surface;

an outer casing for rotatably housing said disk, said casing comprising upper and lower shells that mate to form said casing, each of said upper and lower shells having an inner surface disposed in facing relation, but spaced from a respective surface of said disk, the inner surfaces of the upper and lower shells each having a slot formed therein that extends from a front peripheral edge of the shell toward a center of the shell, said slots cooperating to define a head access opening in the front peripheral edge of said casing and forming an elongate channel in which the recording heads of a disk drive can move to access the recording surface of said flexible disk; and at least one pair of opposing projections formed on the respective inner surfaces of the upper and lower shells proximate the head access opening, said at least one pair of opposing projections having a vertical spacing, S, the outer edge of said flexible disk at the head access opening being disposed between said at least one pair of opposing projections, whereby vertical movement of the edge of said flexible disk is restricted to said spacing, S.

15. The disk cartridge recited in claim 14 wherein said projections are semi-spherical.

16. The disk cartridge recited in claim 14 wherein said at least one pair of opposing projections comprises two pairs of opposing projections, each pair of opposing projections being formed adjacent a respective side edge of said elongate channel proximate the head access opening.

17. The disk cartridge recited in claim 14 further comprising at least three substantially radially extending raised stabilizers each disposed on the inner surface of one of said upper and lower shells, said radially extending stabilizers being arranged on said upper and lower shells so as to induce a predetermined standing wave pattern in the flexible disk when said disk rotates within said casing and to maintain the flexible disk substantially in said predetermined standing wave pattern as a recording head of the disk drive moves over the recording surface of the rotating flexible disk.

18. The disk cartridge recited in claim 17 wherein each of said radially extending stabilizers has a height that increases as the stabilizer extends outwardly of said casing.

19. The disk cartridge recited in claim 17 wherein each of said radially extending stabilizers has a width that increases as said stabilizer extends outwardly of said casing.

20. A removable disk cartridge for a disk drive comprising:

a rotatable flexible disk having at least one recording surface;

an outer casing for rotatably housing said disk, said casing comprising upper and lower shells that join to form said casing, each of said upper and lower shells having an inner surface disposed in facing relation, but spaced from a respective surface of said disk, the inner surfaces of the upper and lower shells each having a slot formed therein that extends from a front peripheral edge of the shell toward a center of the shell, said slots cooperating when said shells are joined to define a head access opening in the front peripheral edge of said casing and forming an elongate channel in which the recording heads of a disk drive can move to access the recording surface of said flexible disk; and each of the inner surfaces of the upper and lower shells having at least one projection formed thereon proximate the front peripheral edge of the shell and adjacent the slot formed therein, said projections being positioned on the respective inner surfaces to oppose each other when the upper and lower shells are joined, said opposing projections having a vertical spacing, S, the outer edge of said flexible disk being disposed between said pair of opposing projections, whereby vertical movement of the edge of said flexible disk is restricted to said spacing, S.

21. The disk cartridge recited in claim 20 wherein each of the inner surfaces of the upper and lower shells has two projections disposed on opposite sides of the slot proximate the front peripheral edge of the shell, said two projections on the inner surface of the upper shell cooperating with the two projections on the inner surface of the lower shell to define two pairs of opposing projections each having a vertical spacing, S.

22. The disk cartridge recited in claim 20 wherein said projections are semi-spherical.

23. The disk cartridge recited in claim 20 further comprising at least three substantially radially extending raised stabilizers each disposed, in any combination thereof, on the inner surfaces of said upper and lower shells, said radially extending stabilizers being arranged on said upper and lower shells so as to induce a predetermined standing wave pattern in the flexible disk when said disk rotates within said casing and to maintain the flexible disk in said predetermined standing wave pattern as a recording head of the disk drive moves over the recording surface of the rotating flexible disk.

24. The disk cartridge recited in claim 23 wherein each of said radially extending stabilizers has a height that increases as the stabilizer extends outwardly of said casing.

25. The disk cartridge recited in claim 23 wherein each of said radially extending stabilizers has a width that increases as said stabilizer extends outwardly of said casing.

* * * * *